US005523989A

United States Patent [19]
Ishibashi

[11] Patent Number: 5,523,989
[45] Date of Patent: Jun. 4, 1996

[54] OPTICAL DISK DRIVE HAVING FUNCTIONS OF DETECTING DISK TILT FROM DIFRRACTION PATTERN OF TRACK AND COMPENSATING DISK TILT WITH USE OF COMATIC LENSES

[75] Inventor: Hiromichi Ishibashi, Ibaraki, Japan

[73] Assignee: Matsushita Electric Industrial Co., Ltd., Kadoma, Japan

[21] Appl. No.: 340,262

[22] Filed: Nov. 15, 1994

[30] Foreign Application Priority Data

Nov. 16, 1993 [JP] Japan ..................... 5-287059

[51] Int. Cl.$^6$ ................................. G11B 7/095
[52] U.S. Cl. .................. 369/44.32; 369/44.41; 369/54; 369/109
[58] Field of Search ............. 369/44.32, 109, 369/44.41, 44.23, 112, 120, 54, 44.12; 250/201.5

[56] References Cited

U.S. PATENT DOCUMENTS

| | | | |
|---|---|---|---|
| 4,674,078 | 6/1987 | Otsuka et al. ............. | 369/44 |
| 5,065,380 | 11/1991 | Yokota ..................... | 369/109 X |
| 5,206,848 | 4/1993 | Kusano et al. ............ | 369/44.41 |
| 5,216,649 | 6/1993 | Koike et al. .............. | 369/44.32 X |
| 5,408,320 | 4/1995 | Katagiri et al. .......... | 356/363 |

FOREIGN PATENT DOCUMENTS

| | | | |
|---|---|---|---|
| 0313818 | 5/1989 | European Pat. Off. ........... | 369/44.32 |
| 0229423 | 8/1992 | Japan ................... | 369/44.32 |

Primary Examiner—W. R. Young
Assistant Examiner—Thang V. Tran
Attorney, Agent, or Firm—Renner, Otto, Boisselle & Sklar

[57] ABSTRACT

An optical disk drive of the present invention includes: a light source for emitting a light beam; an optical system for radiating the light beam onto a desired track formed on an optical disk; a light receiving element for receiving the light beam reflected by the optical disk; and a signal processing circuit for detecting an optical reproduced signal representing information stored in the desired track and control signals for accurately radiating the light beam onto the desired track, in accordance with a light amount of the received light beam, wherein the light receiving element includes first and second light receiving portions, the first light receiving portion receives a part of interference light beams resulting from an interference between a zero-order diffracted light beam and ± first-order diffracted light beams diffracted by the track among the light beam reflected by the optical disk, and the second light receiving portion receives a remaining part of the interference light beams; and wherein the signal processing circuit detects a tilt amount of the optical disk in a radial direction based on a light amount of a light beam received by the first light receiving portion and that received by the second light receiving portion.

11 Claims, 6 Drawing Sheets

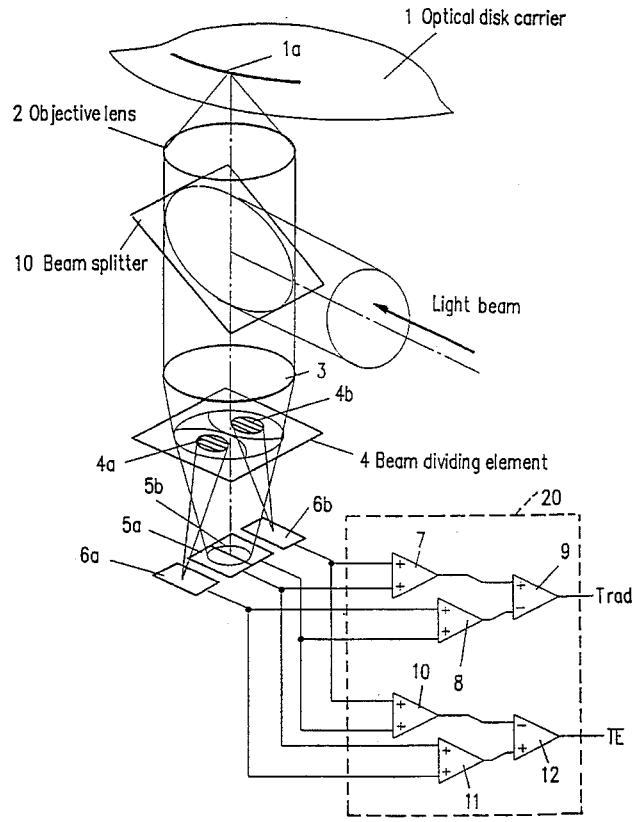

In the absence of skew

Positive skew

Negative skew

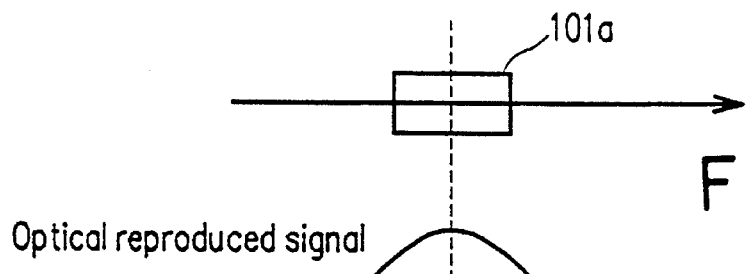
FIG. 4A(i)
Optical reproduced signal
FIG. 4A(ii)
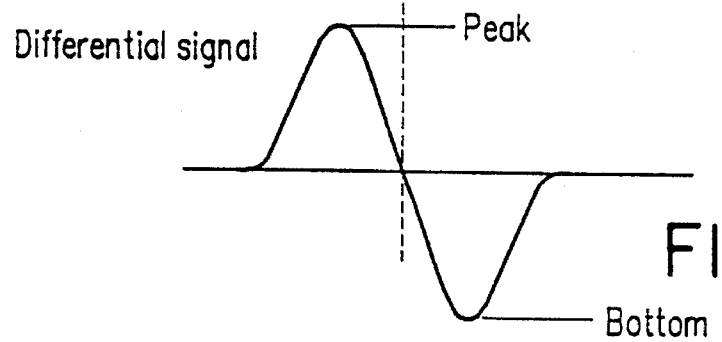
FIG. 4A(iii)
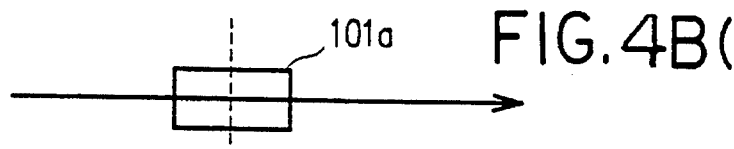
FIG. 4B(i)
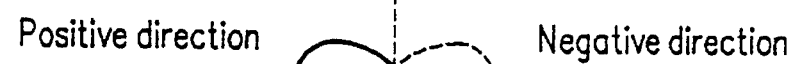
FIG. 4B(ii)
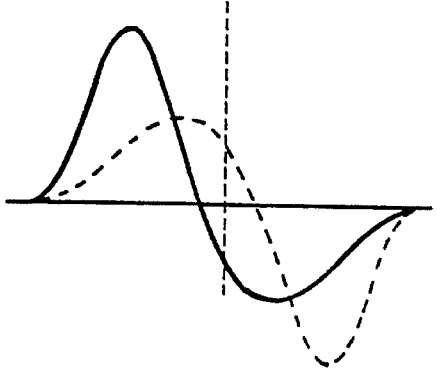
FIG. 4B(iii)

OPTICAL DISK DRIVE HAVING FUNCTIONS OF DETECTING DISK TILT FROM DIFRRACTION PATTERN OF TRACK AND COMPENSATING DISK TILT WITH USE OF COMATIC LENSES

BACKGROUND OF THE INVENTION

1. Field of the Invention

The present invention relates to an optical disk drive for recording and/or reproducing information into and from an optical disk carrier, and especially, to disk tilt detection optical devices for detecting disk tilt, i.e., the skew between the optical disk carrier and the optical axis of an objective lens and the disk tilt correction servo mechanism for compensating the detected disk tilt.

2. Description of the Related Art

FIGS. 7A and 7B show the main portion of an optical disk drive having a conventional disk tilt detection device, which is described in U.S. Pat. No. 4,674,078. Referring to FIGS. 7A and 7B, the conventional disk tilt detection device will be briefly described.

The optical disk drive shown in FIGS. 7A and 7B includes an optical pickup 303 and a disk tilt detection device 305. The optical pickup 303 records and/or reproduces information into and/or from the optical disk carrier 301. The disk tilt detection device detects the skew of the optical disk carrier 301 with respect to the optical axis of the objective lens of the optical pick-up 303. The disk tilt detection device is composed of a light emission element 309 and a pair of light receiving elements 310a and 310b each outputting a signal in accordance with the light intensity of the received light. The light receiving elements 310a and 310b are located so as to be adjacent to each other. In the case of an optical disk drive shown in FIGS. 7A and 7B, the pair of light receiving elements 310a and 310b are located in the vicinity of the optical disk carrier. In such a conventional disk tilt detection device, the light from the light emission element 309 is radiated onto the optical disk carrier 301, and the light reflected by the optical disk carrier 301 is detected by the pair of light receiving elements 310a and 310b. Then, the difference between the outputs of the two light receiving elements 310a and 310b is calculated using a differential amplifier, whereby the amount of the disk tilt is obtained.

Herein, the pair of light receiving elements 310a and 310b are arranged so that the reflected light beam reaches between the two light receiving elements 310a and 310b when the skew of the optical disk carrier 301 with respect to the optical axis is zero degrees, i.e., when the optical axis of the objective lens of the optical pickup is perpendicular to the optical disk carrier. In this arrangement, if a disk tilt arises, the reflected beam is shifted toward one of the light receiving elements 310a and 310b. Accordingly, the electric signal in accordance with the direction and amount of the disk tilt can be obtained by the differential amplifier. Furthermore, the disk tilt can be kept to approximately zero degrees, by adjusting the relationship between the optical disk carrier 301 and the optical axis of the optical pickup 303 so as to make the level of the electric signal zero.

However, in such a conventional disk tilt detection device, the precision of the disk tilt detection is limited. Also, the provision of the disk tilt detection device results in a large-sized optical disk drive, because the light receiving elements 310a and 310b constituting the disk tilt detection device are provided separately from the optical pickup. In addition, in conventional optical disk drives, the detected disk tilt is corrected by inclining the entire optical pickup so as to make the skew between the optical disk carrier 301 and the optical axis of the optical pickup substantially zero. Accordingly, a large-scaled mechanism is required for inclining the entire optical pickup. This is also one of the factors preventing the optical disk drive from being smaller-sized.

SUMMARY OF THE INVENTION

The optical disk drive of the present invention includes: a light source for emitting a light beam; an optical system for radiating the light beam onto a desired track formed on an optical disk; light receiving means for receiving the light beam reflected by the optical disk; and signal processing means for detecting an optical reproduced signal representing information stored in the desired track and control signals for accurately radiating the light beam onto the desired track, in accordance with a light amount of the received light beam, wherein the light receiving means includes first and second light receiving portions, the first light receiving portion receives a part of interference light beams resulting from an interference between a zero-order diffracted light beam and ± first-order diffracted light beams diffracted by the track among the light beam reflected by the optical disk, and the second light receiving portion receives a remaining part of the interference light beams; and wherein the signal processing means detects a tilt amount of the optical disk in a radial direction based on a light amount of a light beam received by the first light receiving portion and that received by the second light receiving portion.

In another aspect of the present invention, an optical disk drive includes: a light source for emitting a light beam; an optical system for radiating the light beam onto a desired track formed on an optical disk; light receiving means for receiving the light beam reflected by the optical disk; signal processing means for detecting a tilt detection signal representing an amount of a tilt of the optical disk in accordance with a light amount of the light beam received by the light receiving means; and disk tilt compensating means for compensating the tilt of the optical disk based on the tilt detection signal, the disk tilt compensating means including: first and second optical elements having substantially the same aberrations and being rotatable around an optical axis of the light beam; first and second rotation means for rotating the first and second optical elements, respectively; and converting means for generating a same direction rotation signal representing a rotation amount of the first and second optical elements in the same direction, and an opposite direction rotation signal representing a rotation amount thereof in an opposite direction in accordance with the tilt detection signal, wherein the disk tilt compensating means rotates the first and second optical elements in the same direction in accordance with the same direction rotation signal and rotates the first and second optical elements in an opposite direction in accordance with the opposite direction rotation signal by the first and second rotation means, and thereby compensating the tilt of the optical disk.

The present invention has been made to eliminate the above-mentioned problems. Thus, the invention described herein makes possible the advantages of (1) providing an optical disk drive capable of detecting disk tilt with high precision, without the need for a light receiving element separately from an optical pickup, and providing (2) an optical disk drive provided with a disk tilt correction servo mechanism with superior response properties capable of correcting a detected disk tilt.

These and other advantages of the present invention will become apparent to those skilled in the art upon reading and understanding the following detailed description with reference to the accompanying figures.

BRIEF DESCRIPTION OF THE DRAWINGS

FIGS. 4A(i)–4A (iii) and 4B(i)–4B(iii) show the relationship between the change in the light amount of a reflected light beam from the optical disk carrier and a wavefront of the differential signal thereof.

DESCRIPTION OF THE PREFERRED EMBODIMENTS

The optical disk drive according to the present invention will be described hereinafter, with reference to accompanying drawings.

Figure 1:
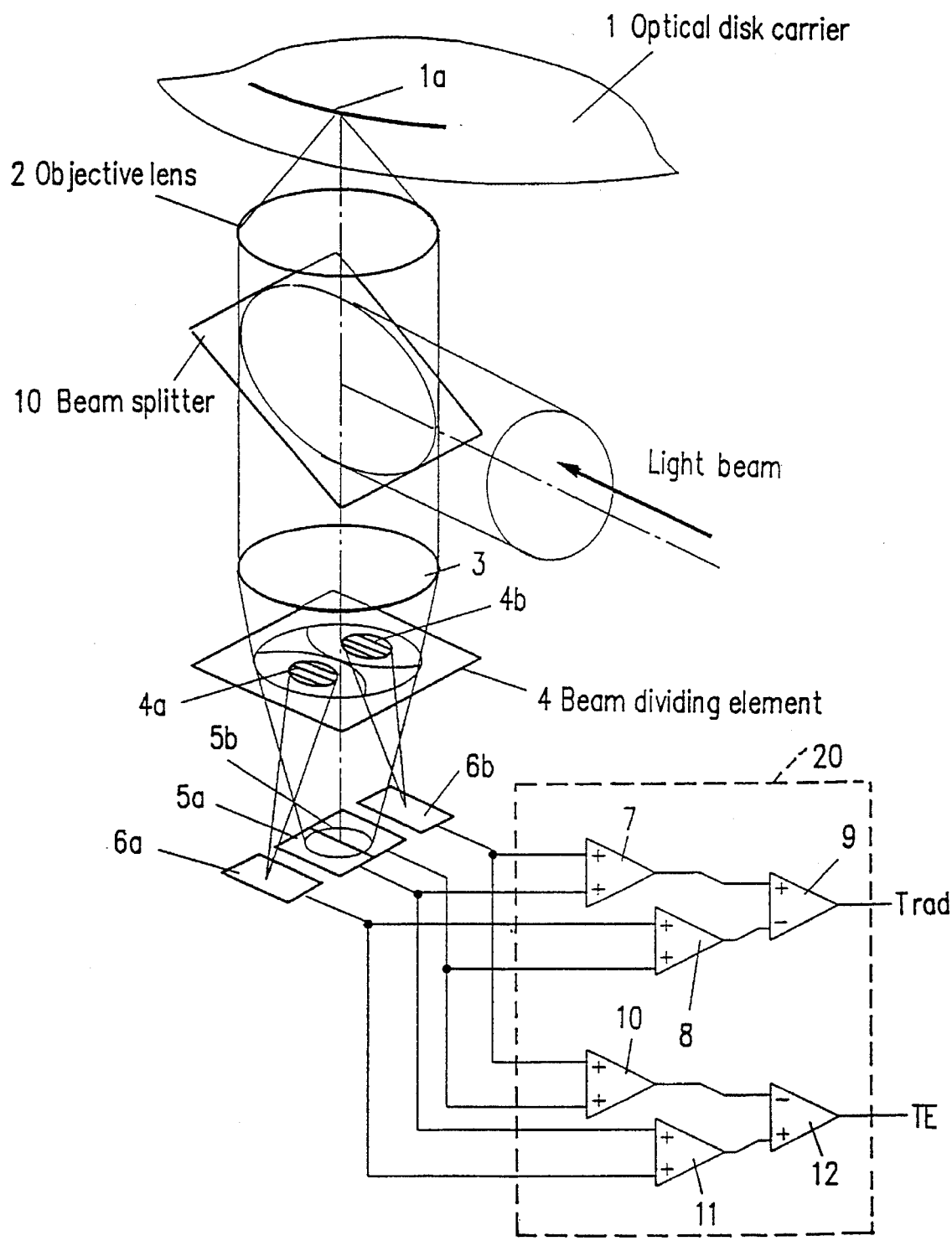
FIG. 1 is a perspective view showing an optical disk drive for a first embodiment of the present invention.

FIG. 1 is a diagram showing the configuration of an optical disk drive for the first embodiment of the present invention. The optical disk drive shown in FIG. 1 includes a light source (not shown) which is a laser diode or the like, an objective lens 2, a concentration lens 3, a beam dividing element 4, light receiving elements 5a, 5b, 6a and 6b, a beam splitter 10 and a signal processing circuit 20. In addition to these components, the optical disk drive may provide a variety of optical elements depending on the requirements.

The light beam emitted from the light source is reflected by the beam spitter 10, and then is incident onto the objective lens 2. The objective lens 2 converges the light beam so as to form a light spot on the information track 1a formed on the recording layer of an optical disk carrier 1. The light beam reflected by the optical disk carrier 1 repasses through the objective lens 2, and then is incident onto the beam spitter 10. The beam spitter 10 transmits the reflected light beam therethrough instead of reflecting it. Next, the reflected light beam transmits through the concentration lens 3, and is divided into a plurality of beams by the beam dividing element 4. Thereafter, the plurality of beams are detected by the light receiving elements 5a, 5b, 6a and 6b.

The beam dividing element 4 has a transparent plate-shaped base substrate and minute prisms 4a and 4b formed on the base substrate. The beam dividing element 4 may be a glass substrate having the prisms fabricated by processing part of the surface of the substrate, a hologram element, or the like. The beam dividing element 4 is located on the optical axis of the reflected light beam in the far field, i.e., in the region where the reflected light beam is sufficiently diverged. In the far field, a zero-order diffracted beam and a plus first-order diffracted beam among the reflected light beam, which are diffracted by the information track 1a, interfere with each other. Also, the zero-order diffracted beam interferes with a minus first-order diffracted beam. Thus, a pair of interference beams are generated. A part of one of the interference beams is guided to the light receiving element 6a, by means of the minute prism 4a, and part of the other interference beam is guided to the light receiving element 6b by means of the minute prism 4b. The remaining parts of the interference light beams are respectively guided to the light receiving elements 5a and 5b.

The light receiving elements 5a and 5b, which function as the second light receiving portion, are arranged symmetrically with respect to the optical axis of the reflected light beam in the radial direction of the optical disk carrier 1. The light receiving elements 6a and 6b as the first light receiving portion are disposed so as to sandwich the light receiving elements 5a and 5b. The light receiving element 5a is disposed so as to detect the remaining part of the interference beam, a part of which is also guided to the light receiving element 6a. As for the other interference beam, it is detected by the light receiving elements 5b and 6b in a similar manner.

The outputs from the light receiving elements 5a, 5b, 6a and 6b are input to the signal processing circuit 20. As shown in FIG. 1, the signal processing circuit 20 includes add amplifiers 7, 8, 10 and 11 and differential amplifiers 9 and 12. The amplifiers 7, 8 and 9 constitute a circuit for detecting a signal $T_{rad}$ representing the tilt amount in the radial direction of the optical disk carrier 1. The signal $T_{rad}$ is obtained by using the outputs from the light receiving elements 5a, 5b, 6a and 6b. Meanwhile, the amplifiers 10, 11 and 12 are used for detecting a tracking error signal TE for a tracking servo control. This control allows the light spot to be accurately placed on the information track 1a. The signal $T_{rad}$ and the tracking error signal TE are respectively obtained by the below-mentioned Equations (1) and (2):

$$T_{rad}=A_2+B_1-(A_1+B_2) \quad (1)$$

$$TE=A_1+B_1-(A_2+B_2) \quad (2)$$

where $A_1$ and $A_2$ are the outputs from the light receiving elements 6a and 6b, and $B_1$ and $B_2$ are the outputs from the light receiving elements 5a and 5b, respectively.

Furthermore, the signal processing circuit 20 calculates an optical reproduced signal RF representing the information stored in the information track 1a, using an amplifier etc. (not shown in FIG. 1). The optical reproduced signal RF is obtained by the following Equation (3):

$$RF=A_1+B_1+(A_2+B_2) \quad (3)$$

In addition, a focusing error signal for a focusing servo control whereby the light beam is properly focused onto the information track 1a, can be detected by a variety of conventional techniques using the outputs of light receiving elements (not shown) provided separately from the light receiving elements 5a, 5b, 6a and 6b. As for the detection of the focusing error signal, description thereof will be omitted in this specification.

Figure 2A:
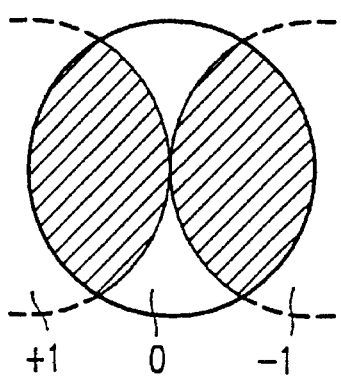
FIGS. 2A through 2C show the diffraction patterns formed in the far field by a reflected light beam from an optical disk carrier.
Figure 2B:
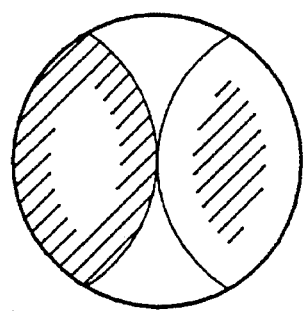
Figure 2C:
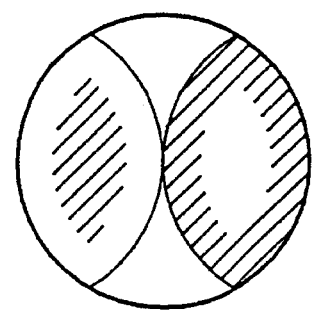

Next, with reference to FIGS. 2A through 2C, the principles of the operation when detecting the tilt amount in the radial direction of the optical disk carrier will be described.

When the light beam is reflected by the information track 1a, a diffraction is caused by the edge of the track. As a result, the zero-order diffracted light beam traveling along the optical axis arises. At the same time, the ± first-order diffracted light beams arise on both sides thereof. The zero-order diffracted light beam interferes with the ± first-order diffracted light beams in the far field region. Hereinafter, the region in which the interference light beam passes will be referred to as "the interference region", while the remaining region will be referred to as "the non-interference region". In the case where the optical axis of the objective lens 2 has no skew with respect to the optical disk carrier 1, i.e., where the light beam converged by the objective lens 2 is radiated on the approximate center line of the information track 1a, the ± first-order diffracted light beams each have a constant phase difference with respect to the zero-order diffracted light beam. So, the light intensity of the light in the interference region is either larger or smaller than that in the non-interference region by a substantially equal amount. FIG. 2A shows an exemplary light intensity distribution (diffraction pattern) of the reflected light beam in the cross-section along the plane perpendicular to the optical axis. The zero-order diffracted light beam is indicated by a solid line. The ± first-order diffracted light beams are indicated with by broken lines. The parts in which the zero-order diffracted beam is overlapped with the ± first-order diffracted light beams show the interference regions. Here the interference region is hatched, because the light intensity in the interference region is smaller than that in the non-interference region in this embodiment.

On the other hand, in the case where there is a skew, aberrations arise on the optical disk carrier 1, among which a comatic aberration is the most problematic. "Aberration" refers to the non-uniform distribution of phase difference within the same wavefront. When there exists such a non-uniform distribution, the phase differences between the zero-order diffracted light beam and the ± first-order diffracted light beams also become non-uniform. As a result, as shown in FIG. 2B or 2C, the distribution of the light intensity becomes non-uniform in each of the interference regions. FIG. 2B shows the case where the optical axis of the objective lens 2 tilts by θ degrees with respect to the radial direction of the optical disk carrier 1, i.e., the direction perpendicular to the information track 1a. FIG. 2C shows the case where the optical axis tilts by −θ degrees in the radial direction. As is apparent from FIGS. 2B and 2C, when a skew arises, the light intensity in a small area within each of the interference regions is different from that in the remaining area of each of the interference regions. Specifically, when the light intensity in the small area of one interference region is greater than that in the remaining area in the other interference region, the light intensity in the small area becomes less than that in the remaining area. Accordingly, if the difference between the light intensity in the small area where the light intensity decreases or increases, and that in the other portions of the interference regions is obtained, it becomes possible to know the amount of disk tilt. In addition, depending on whether the obtained value is positive or negative, it is also possible to know the side to which the disk carrier of the optical disk tilts in the radial direction.

Specifically, the direction and the amount of disk tilt are obtained based on the outputs of the light achieving elements 5a, 5b, 6a, and 6b arranged as shown in FIG. 1. In the configuration as shown in FIG. 1, from among the reflected light beam incident on the beam dividing element 4, parts thereof passing through the above-mentioned small areas are deflected by the minute prisms 4a and 4b, and guided to the light receiving elements 6a and 6b. The remaining parts of the reflected light beam, which are not incident on the minute prism 4a or 4b, travel through the beam dividing element 4 and are guided to the light receiving elements 5a and 5b. The light receiving elements 5a and 5b detect not only the reflected light beam passing through the interference regions excluding the small areas but also the reflected light beam passing through the non-interference region. The outputs from the respective light receiving elements are subjected to the operation as expressed by the above-mentioned Equation (1). As a result, even if an offset arises, it is possible to correctly obtain the radial tilt detection signal $T_{rad}$ having a level corresponding to the amount of the tilt and the direction in which the optical disk carrier 1 tilts with respect to the optical axis in the radial direction.

In this way, by obtaining the difference between the intensity of the part of the light beams passing through the small area within the interference regions where the zero-order diffracted beam interferes with the ± first-order diffracted beams and that of the remaining part of the reflected light beam, the amount and direction of the disk tilt can be easily detected using this configuration for detecting the tracking error signal and the optical reproduced signal. In addition, according to the present invention, the detecting precision can be greatly enhanced compared with conventional detection methods. In the case of the conventional detection technique requiring the light receiving element for detecting the disk tilt to be provided separately from the optical pickup, it is very difficult to precisely detect the disk tilt of about 0.1 degree due to the low S/N (the ratio of signal to noise) of the light receiving element and the offset. On the other hand, the optical disk drive of the present invention can efficiently detect the disk tilt of about 0.1 degree. This is because, even if the skew of the optical disk carrier 1 with respect to the optical axis of the objective lens 2 is only about 0.1 degree, the aberration caused thereby corresponds to the phase difference on the order of many degrees, which prominently changes the intensity distribution of the reflected light beam.

As described in the foregoing, in the optical disk drive shown in FIG. 1, the disk tilt in the radial direction can be detected with high precision, without the need for components for disk tilt detection provided separately from the optical pickup. However, this optical disk drive shown in FIG. 1 can not detect the disk tilt in the tangential direction of the track (hereinafter, referred to as "the tangential tilt"). So, the optical disk drive which can very precisely detect the tangential tilt as well as the disk tilt in the radial direction will be described in the second embodiment.

Figure 3:
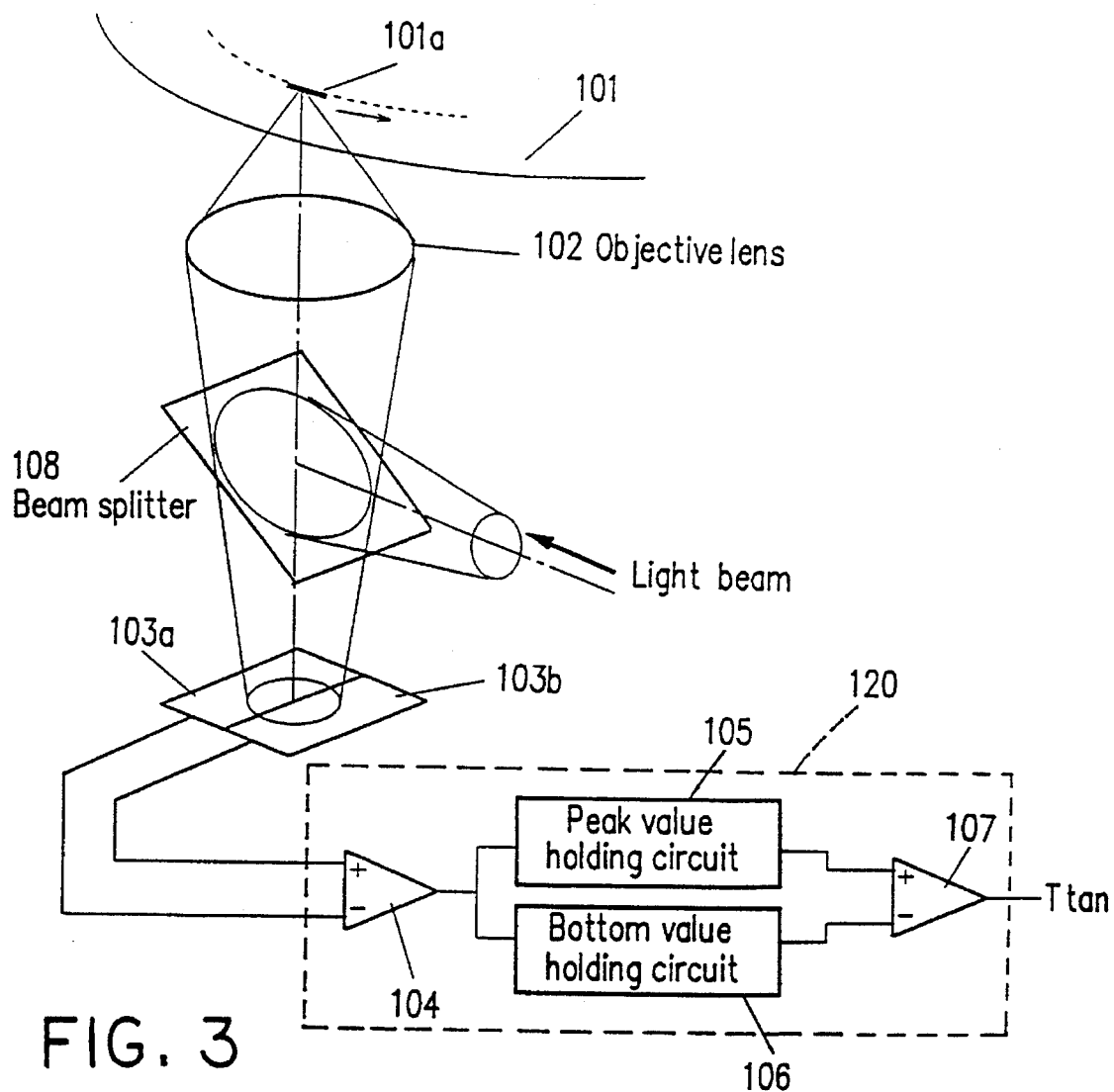
FIG. 3 is a diagram showing the configuration of an optical disk drive for a second embodiment of the present invention.

FIG. 3 is a diagram showing the configuration of the optical disk drive for the second embodiment of the present invention. The optical disk drive shown in FIG. 3 includes a light source (not shown) such as a laser diode, an objective lens 102, light receiving elements 103a and 103b, a beam splitter 108, and a signal processing circuit 120. The signal processing circuit 120 is composed of differential amplifiers 104 and 107, a peak value holding circuit 105 and a bottom value holding circuit 106. In addition to these components, the optical disk drive may provide a variety of optical elements depending on other requirements.

The light beam emitted from the light source is reflected by the beam splitter 108 and then is incident onto the objective lens 102. The objective lens 102 converges the light beam onto the recording face of the optical disk carrier 101. The optical disk carrier 101 rotates at a constant speed. On the recording face thereof, information marks 101a are recorded along the information track indicated by a broken line in FIG. 3. The objective lens 102 forms a light spot on one information mark 101a by converging the light beam thereon.

The light beam reflected by the optical disk carrier 101 passes through the objective lens 102 and the beam splitter 108 in this order, so as to be incident onto the light receiving elements 103a and 103b. The light receiving elements 103a and 103b are arranged so as to be adjacent to each other in the direction of the rotational tangent of the optical disk carrier 101, i.e., in the tangential direction. Each of the light receiving elements 103a and 103b generates the output having the level corresponding to the light amount of the received light beam. The outputs of the light receiving elements 103a and 103b are input to the differential amplifier 104 of the signal processing circuit 120. The differential amplifier 104 performs the subtraction for the outputs of the light receiving elements 103a and 103b, whereby the differential value of the optical reproduced signal obtained from the reflected light beam is obtained. The differential value thus obtained is sequentially supplied to the peak value holding circuit 105 and the bottom value holding circuit 106. The peak value holding circuit 105 samples and holds the peak value of the output of the differential amplifier 104. The bottom value holding circuit 106 samples and holds the bottom value thereof. The differential amplifier 107 calculates the difference between the output of the peak value holding circuit 105 and that of the bottom value holding circuit 106.

Next, the principle of the detection of the tangential tilt will be described. As described earlier, the light receiving elements 103a and 103b and the differential amplifier 104 function as a differentiator performing the differentiation of the optical reproduced signal obtained from the reflected light beam. This optical reproduced signal is obtained when the information mark 101a is scanned by the light spot and has a level corresponding to the light amount of the reflected light beam.

FIGS. 4A(i)–4A(iii) show the changes in the light amount of the reflected light beam, i.e., the changes in the sum of the outputs from the light receiving elements 103a and 103b, in the case where the optical disk carrier 101 does not tilt with respect to the optical axis of the objective lens 102. As shown in FIGS. 4A(i)–4A(iii), the waveform of the optical reproduced signal obtained by scanning the information mark 101a with the light spot is symmetrical with respect to the point recording the peak value, at which the light spot is placed on the center of the information mark 101a. The differential amplifier 104 outputs the value resulting from the differentiation of this optical reproduced signal. In the case of the skew being zero, an S-shaped waveform is obtained in which the absolute value of the peak value and that of the bottom value are approximately the same, as shown in FIGS. 4A(i)–4A(iii).

Here, if the tilt occurs in the tangential direction, the waveform of the optical reproduced signal is distorted. That is, the point recording the peak value deviates forward or backward with respect to the point at which the light spot is placed on the center of the information mark 101a, as indicated by a solid line and a broken line in FIGS. 4B(i)–4B(iii). This deviation is caused by the comatic aberration resulting from the tangential tilt. Hereinafter, the disk tilt arising when the optical disk carrier 101 tilts backward in the traveling direction of the light spot with respect to the optical axis will be referred to as a disk tilt in "the positive direction", while the disk tilt arising when it tilts forward will be referred to as a disk tilt in "the negative direction". As a result, the waveform of the output from the differential amplifier 104, obtained by differentiating the optical reproduced signal, has a form in which the absolute value of the peak value and that of the bottom value are not equal to each other as shown in FIGS. 4B(i)–4B(iii). Thus, the difference between the peak value and bottom value of the signal obtained by differentiating the optical reproduced signal changes in accordance with the amount of the tangential tilt. Accordingly, the amount and direction of the tangential tilt can be found by obtaining this difference.

Hence, in the second embodiment, the peak and bottom values of the output from the differential amplifier 104 are sampled and held by the peak value holding circuit 105 and the bottom value holding circuit 106, respectively. The difference between the outputs from these circuits 105 and 106 is calculated by the differential amplifier 107, whereby a tangential tilt detection signal $T_{tan}$ representing the amount and direction of the tangential tilt is obtained. The level of this tangential tilt detection signal $T_{tan}$ is zero when no tangential tilt arises, and changes by the correct amount into a negative or positive value in accordance with the amount and direction of the tilt.

As described in the foregoing, according to the present invention, the disk tilt in the tangential direction can be detected with high precision by a simply configured optical system.

Also in the second embodiment, a differentiator for differentiating the optical reproduced signal is constituted by the light receiving elements 103a, 103b and the differential amplifier 104. The configuration for obtaining the differentiated signal of the optical reproduced signal is not limited solely to this one. For example, a configuration using only one light receiving element and electrically differentiating the output therefrom may be employed. However, in the case of electrically performing differentiation, the S/N ratio of the tangential tilt signal $T_{tan}$ is likely to deteriorate.

In the above-mentioned first embodiment, the optical disk drive capable of detecting the disk tilt in the radial direction is described. In the second embodiment, the optical disk capable of detecting the disk tilt in the tangential direction is described. But, the optical disk drive capable of detecting the disk tilt in both the radial and tangential directions is achieved only by halving each of the light receiving elements 5a and 5b.

Figure 5:
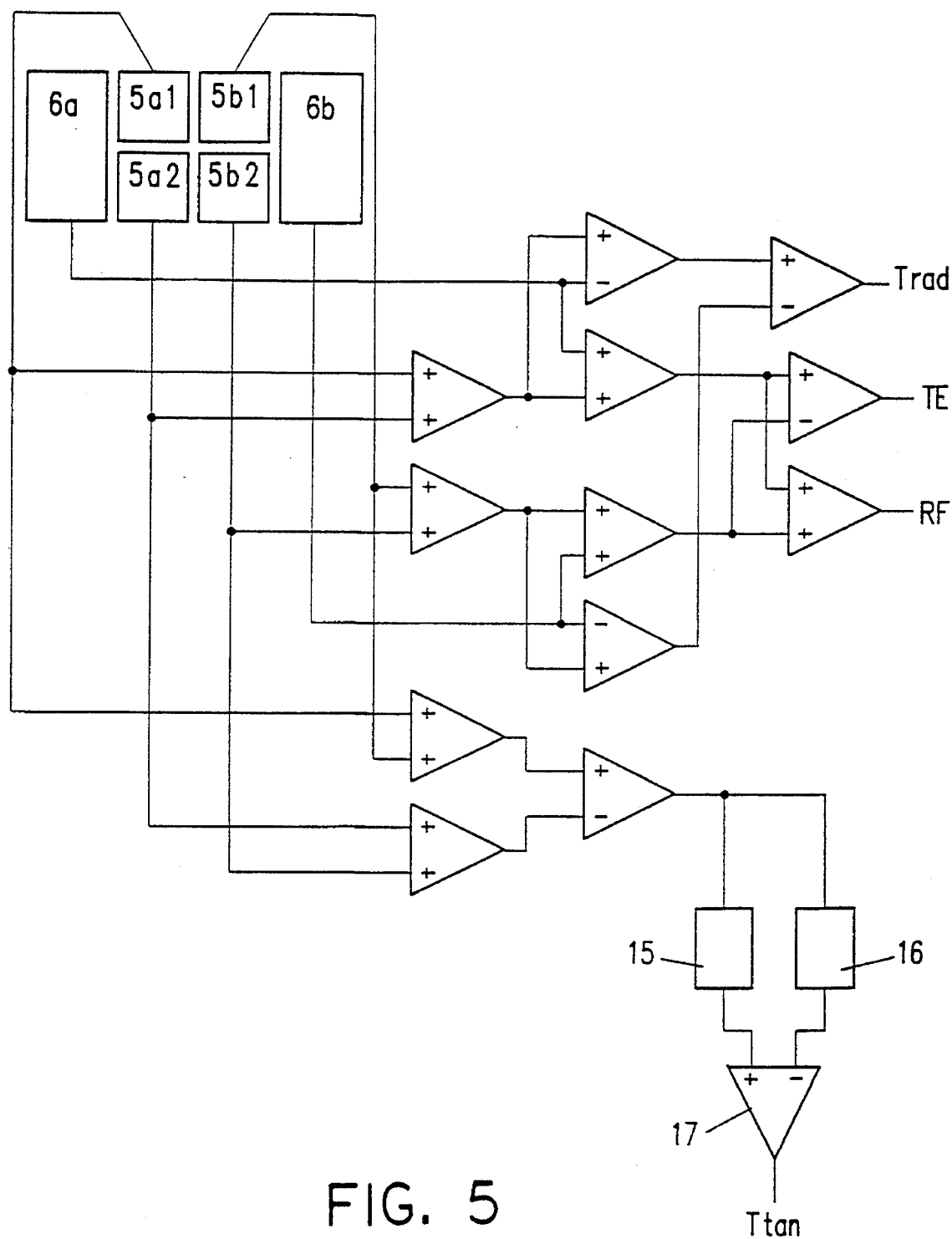
FIG. 5 is a diagram showing the arrangement of light receiving elements provided in the optical disk drive for a modified embodiment of the present invention.

FIG. 5 shows the arrangement of the light receiving elements and the configuration of the signal processing circuit (equivalent to the signal processing circuit 20) for such an optical disk drive. The arrangement of the light receiving elements as shown in FIG. 5 is the same as that shown in FIG. 1, excepting that the light receiving element 5a shown in FIG. 1 is replaced with light receiving elements $5a_1$ and $5a_2$ and that the light receiving element 5b is replaced with light receiving elements $5b_1$ and $5b_2$. The sum of the outputs from the light receiving elements $5a_1$ and $5a_2$ is equivalent to that of the light receiving element 5a shown in FIG. 1, while the sum of the outputs from the light receiving elements $5b_1$ and $5b_2$ is equivalent to that of the light receiving element 5b shown in FIG. 1. Furthermore, the sum of the outputs from the light receiving elements $5a_1$ and $5b_1$ is equivalent to that of the light receiving element 13a shown in FIG. 3, while the sum of the outputs from the light receiving elements $5a_2$ and $5b_2$ is equivalent to that of the light receiving element 13b shown in FIG. 3. Accordingly, by providing the signal processing circuit with an add amplifier required for performing these additions and an electrical circuit necessary for detecting the tangential tilt shown in FIG. 3, e.g., the circuits 105 and 106, the optical disk drive shown in FIG. 1 can detect the disk tilt in both the radial direction and also in the tangential direction.

In the optical disk drive having the light receiving elements and the signal processing circuit as shown in FIG. 5, the signal $T_{rad}$, the tracking error signal TE, and the optical reproduced signal RF are obtained by performing the following Equations (4) through (6):

$$T_{rad}=(B_{a1}+B_{a2})-A_1-(B_{b1}+B_{b2})-A_2 \quad (4)$$

$$T_E=(B_{a1}+B_{a2})+A_1-(B_{b1}+B_{b2})-A_2 \quad (5)$$

$$RF=(B_{a1}+B_{a2})+A_1+(B_{b1}+B_{b2})+A_2 \quad (6)$$

where $A_1$ and $A_2$ are the outputs of the light receiving elements 6a and 6b, and $B_{a1}$, $B_{a2}$, $B_{b1}$ and $B_{b2}$ are the outputs of the light receiving elements $5a_1$, $5a_2$, $5b_1$, and $5b_2$, respectively.

In addition, the tangential tilt detection signal $T_{tan}$ is obtained in the following manner. The peak and bottom values of the output obtained by the following Equation (7) are sampled and held by the peak value holding circuit 15 and the bottom value holding circuit 16 as described in the second embodiment, respectively.

$$(B_{a1}+B_{b1})-(B_{a2}+B_{b2}) \quad (7)$$

Then, the difference between the outputs of the peak value holding circuit 15 and the bottom value holding circuit 16 is calculated, whereby the tangential tilt detection signal $T_{tan}$ can be obtained.

As described above, the present invention realizes an optical disk drive capable of highly precisely detecting the amounts of the disk tilt in both the radial direction and the tangential direction. Additionally, in the optical disk drive of the present invention, the light receiving elements or the like for detecting the disk tilt need not be provided separately from the light receiving elements for detecting the error signal and the optical reproduced signal, which is included in the optical pickup. Hence, large-sizing of the overall optical disk drive due to the provision of the disk tilt detection components is unnecessary.

Hereinafter, the optical disk drive capable of compensating the detected disk tilt will be described.

Figure 6:
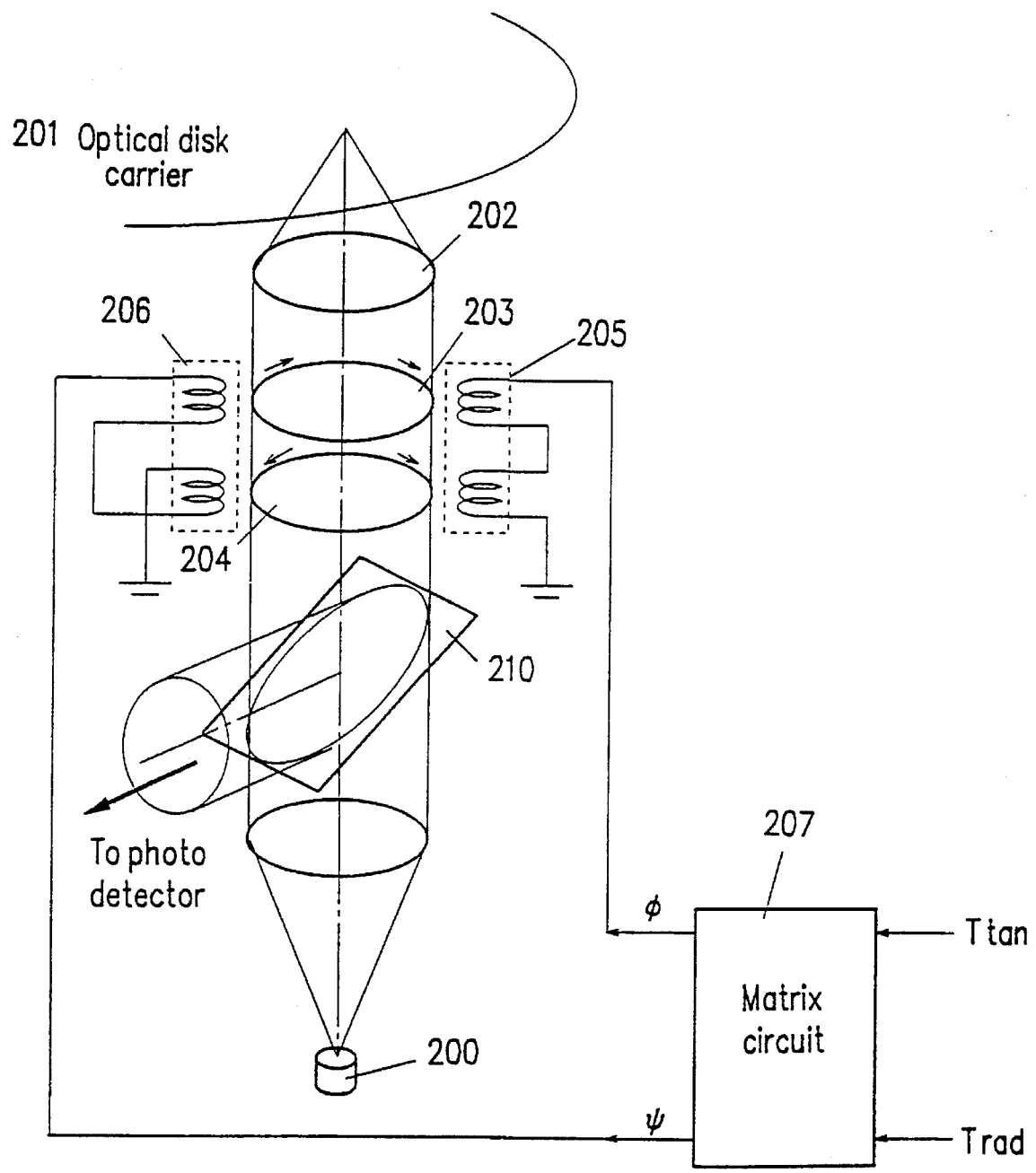
FIG. 6 is a diagram showing the configuration of a disk tilt compensation servo mechanism of an optical disk drive for a third embodiment of the present invention.
Figure 7A:
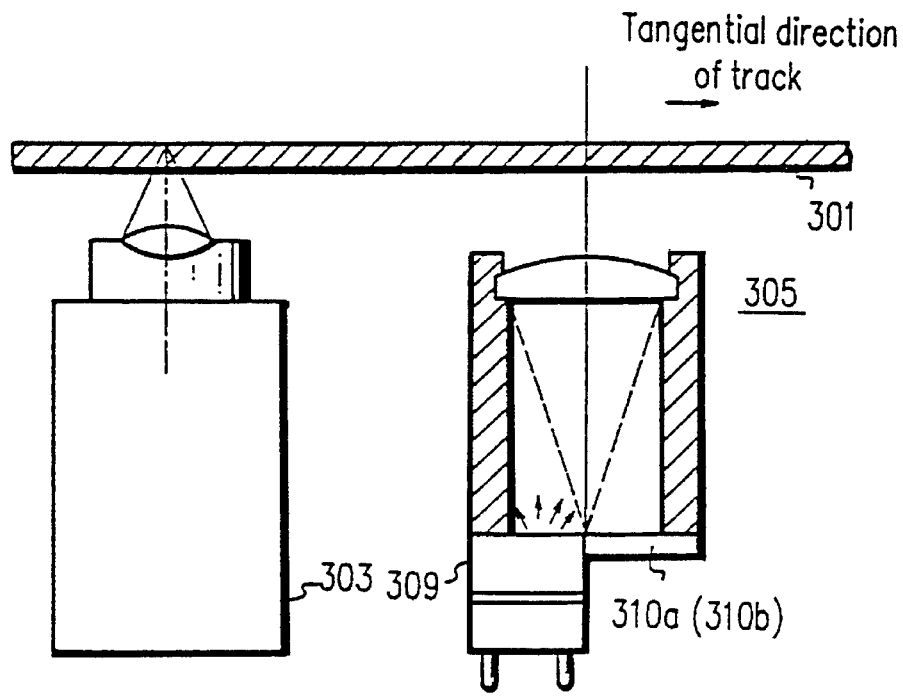
FIGS. 7A and 7B show the main portion of an optical disk drive having a conventional disk tilt detection device.
Figure 7B:
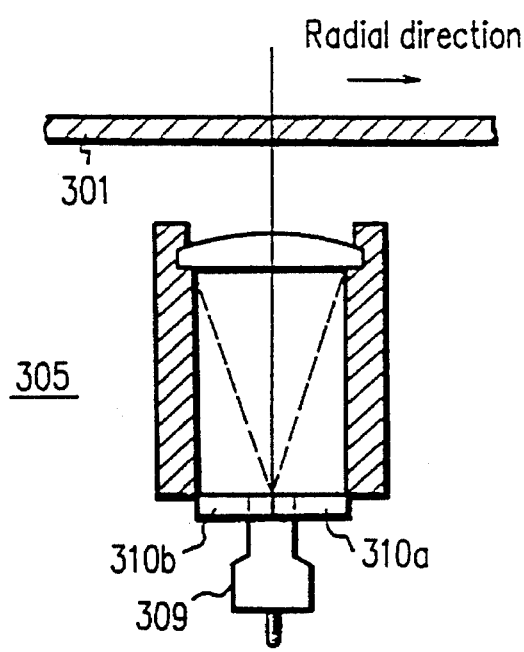

FIG. 6 is a diagram showing the optical disk drive for the third embodiment of the present invention. The optical disk drive shown in FIG. 6 includes a laser diode 200, an objective lens 202, a pair of comatic lenses 203 and 204, rotation devices 205 and 206 for rotating the comatic lenses 203 and 204 around the optical axis, a matrix circuit 207 and a beam splitter 210. In addition to these components, the optical disk drive may provide a variety of optical elements depending on the necessary requirements.

The light beam emitted from the laser diode 200 passes through the beam splitter 210, the comatic lenses 203 and 204 and then is incident onto the objective lens 202. These comatic lenses 203 and 204, having substantially the same comatic aberrations, are both located on the optical axis on the light source side of the objective lens 202.

The rotation devices 205 and 206 make both comatic lenses 203 and 204 rotate in the same direction by φ degrees and in the opposite direction by ϕ degrees. In the matrix circuit 207, the rotation amount φ in the same direction and the rotation amount ϕ in the opposite direction are determined in accordance with the amount and direction of the disk tilt. The manner of determining these rotation amounts φ and ϕ will be described hereinafter.

Now, it is assumed that the comatic lens 203 and 204 each have a comatic aberration W expressed by the following Equation (8):

$$W(r, \theta)=wr^3 \cos(\theta) \quad (8)$$

Equation (8) is expressed by using the polar coordinates, where r stands for the radius of the respective comatic lenses 203 and 204 centered by the optical axis, θ stands for the azimuth angle, and w is a coefficient. The comatic lenses 203 and 204 with the thus expressed comatic aberrations may be realized by the lenses in which the incident surface is actually in such a shape. Also, it may be realized by a concave or convex lens tilted along the optical axis. Alternatively, the hologram element or the like having the comatic aberration expressed by Equation (8) may be used in place of the comatic lenses 203 and 204.

Next, the case where a pair of lenses 203 and 204 each having such a comatic aberration are rotated in the same direction by φ degrees around the reference axis, and then rotated by ϕ degrees in the directions opposite to each other will be described. In such a case, the composite aberration Ws of the pair of comatic lenses 203 and 204 is expressed by the following Equations (9) and (10):

$$\begin{aligned} Ws(r, \theta) &= w(r, \theta - \phi - \varphi) + W(r, \theta - \phi + \varphi) \quad (9)\\ &= wr^3 \{\cos(\theta - \phi - \varphi) + \cos(\theta - \phi - \varphi)\}\\ &= 2wr^3\cos\varphi\cos(\theta - \phi)\\ &= k(\varphi)\cos(\theta - \phi) \end{aligned}$$

$$k(\varphi)=2wr^3\cos\varphi \quad (10)$$

As is apparent from these Equations (9) and (10), the angle ϕ of the rotation in the opposite direction contributes to the coefficient term. That is, the aberration coefficient k(ϕ) of the composite aberration Ws can be made variable from zero to 2w by adjusting the angle ϕ of the rotation in the opposite direction. Also, the aberration caused by the lenses 203 and 204 can be rotated around the optical axis by rotating the comatic lenses 203 and 204 in the same direction.

In the optical disk drive shown in FIG. 6, the matrix circuit 207 receives the signal representing the amount and direction of the disk tilt. On the basis of the received signal, the matrix circuit 207 calculates the angle φ of the rotation in the same direction and the angle ϕ of the rotation in the opposite direction. The signal representing the amount and direction of the disk tilt, which is given to the matrix circuit 207 and used for this calculation, may be detected by any method. In this embodiment, based on the signal $T_{rad}$ representing the amount and direction of the disk tilt in the radial direction and the signal $T_{tan}$ representing the amount and direction of the disk tilt in the tangential direction, the matrix circuit 207 calculates the angle φ of the rotation in the same direction and the angle ϕ of the rotation in the opposite direction, on the basis of the signals $T_{rad}$ and $T_{tan}$ obtained by the techniques explained in the first and second embodiments.

The radial tilt detection signal $T_{rad}$ and the tangential tilt detection signal $T_{tan}$, respectively, represent the components of the disk tilt perpendicular to each other. Accordingly, by using these signals $T_{tan}$ and $T_{rad}$, the direction φ in which the comatic aberration resulting from the disk tilt arises and the absolute value k of the comatic aberration are expressed as follows:

$$\phi=\tan^{-1}(T_{rad}/T_{tan}) \quad (11)$$

$$k=(T_{rad}^2+T_{tan}^2)^{1/2} \qquad (12)$$

Using the above-mentioned Equation (10), φ can be obtained from k. Hence, the pair of comatic lenses 203 and 204 are both rotated around the optical axis in the same direction by φ degrees, and then in the direction opposite to each other by −φ degrees, whereby the comatic aberration caused by the disk tilt can be canceled out. Thus, the disk tilt can be substantially compensated.

In this way, the present invention assures the substantial compensation of the disk tilts arising in the radial and tangential directions, without the need for a large-sized arrangement to be employed as in conventional techniques such as inclining the entire stage carrying the optical pickup. In addition, the disk tilt compensation having superior response properties is realized, because the disk tilt compensation is achieved by adjusting only the rotation amount of a pair of optical elements having comatic aberrations substantially of the same degree (i.e., in the case of the third embodiment, the comatic lenses 203 and 204).

As described above, in the optical disk drive of the present invention, when the optical disk carrier tilts with respect to the optical axis of the objective lens, the amount of the disk tilt in the radial direction is detected based on the change of the light intensity in the interference regions between the zero-order diffracted light beam and the ± first order diffracted light beams which are generated by the information track. So, the disk tilt in the radial direction can be detected with high precision. In addition, the disk tilt in the radial direction can be detected using the light receiving element for detecting the tracking error signal, used for the tracking control, the optical reproduced signal and the like. Accordingly, there is no need for providing a sensor for disk tilt detection separately from the optical pickup.

Furthermore, the changes in the light intensity of the light beam reflected by the rotating optical disk carrier is differentiated so that the disk tilt in the tangential direction is detected as the difference between the peak and bottom values of the differential value. Thus, the disk tilt in the tangential direction can be detected by a simple optical system. In addition, the configuration of the light receiving element of the above-mentioned optical disk drive capable of detecting the disk tilt in the radial direction may be modified a little, and several elements may be added to the signal processing circuit thereof. In this way, the thus configured optical disk drive can detect the disk tilt in both the radial and tangential directions without the need to provide the device for disk tilt detection separately from the optical pickup. This is very useful in small-sizing the optical disk drive.

Furthermore, a pair of optical elements having comatic aberrations substantially of the same degree may be provided on the optical path from the light source to the optical disk carrier so as to be rotatable around the same optical axis. The disk tilt can be compensated with superior response properties by adjusting the rotation amounts of these optical elements. For example, both the two lenses having comatic aberrations substantially of the same degree may be rotated in the same direction and also the opposite direction by the respective rotation amounts determined in accordance with their disk tilts, whereby the comatic aberration caused by both the disk tilts in the radial and tangential directions can be canceled out by the composite comatic aberration generated by the pair of lenses. The rotation amounts in the same direction and in the opposite direction are determined based on the disk tilts in the radial direction and in the tangential directions. Additionally, in the case of compensating the disk tilt according to the present invention, a large-scaled device for inclining the entire stage carrying the optical pickup, as employed in conventional techniques, is not necessary. Hence, the compensation of the disk tilt is achieved without large-sizing the optical disk drive.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk drive comprising:

a light source for emitting a light beam;

an optical system for radiating the light beam onto a desired track formed on an optical disk;

light receiving means for receiving the light beam reflected by the optical disk; and signal processing means for detecting an optical reproduced signal representing information stored in the desired track and control signals for accurately radiating the light beam onto the desired track, in accordance with a light amount of the received light beam, wherein the light receiving means includes first and second light receiving portions, the first light receiving portion receives a part of interference light beams resulting from an interference between a zero-order diffracted light beam and ± first-order diffracted light beams diffracted by the track among the light beam reflected by the optical disk, and the second light receiving portion receives a remaining part of the interference light beams; and wherein the signal processing means detects a tilt amount of the optical disk in a radial direction based on a light amount of a light beam received by the first light receiving portion and that received by the second light receiving portion.

2. An optical disk drive according to claim 1, further comprising light dividing means for guiding the part of the interference light beams to the first light receiving portion and for guiding the remaining part of the interference light beams to the second light receiving portion, the light dividing means being located on an optical axis of the light beam reflected by the optical disk.

3. An optical disk drive according to claim 1, wherein the first light receiving portion includes first and second light receiving elements, and the second light receiving portion includes third and fourth light receiving elements located symmetrically with respect to the optical axis of the light beam reflected by the optical disk, the first and second light receiving elements being located so as to sandwich the second light receiving portion therebetween.

4. An optical disk drive according to claim 3, wherein the first light receiving element is adjacent to the third light receiving element, the second light receiving element is adjacent to the fourth light receiving element, and the first, second, third and fourth light receiving elements respectively output first, second, third and fourth detection signals in accordance with a light amount of a received light beam; and wherein the signal processing means includes first operation means for performing an operation of subtracting a sum of the first and fourth detection signals from a sum of the second and third detection signals and thereby detecting the tilt amount of the optical disk in the radial direction.

5. An optical disk drive according to claim 4, wherein the signal processing means includes:

second operation means for obtaining a differential value of changes in light amount of the light beam received by the light receiving means; and tangential tilt detection means for detecting a tilt amount in a direction of a tangent of the desired track of the optical disk in accordance with the differential value.

6. An optical disk drive according to claim 5, wherein the tangential tilt detection means includes:

peak value detection means for sampling and holding a peak value of the differential value;

bottom value detection means for sampling and holding a bottom value of the differential value; and third operation means for calculating a difference between the peak value received from the peak value detection means and the bottom value received from the bottom value detection means, and thereby detecting the tilt amount in the tangential direction.

7. An optical disk drive according to claim 6, wherein each of the third and fourth light receiving elements of the second light receiving portion is divided into first and second sub-elements by a line perpendicular to the tangential direction; and wherein the second operation means calculates a difference between a sum of outputs of the first sub-element of the third light receiving element and the first sub-element of the fourth light receiving element and a sum of output of the second sub-element of the third light receiving element and the second sub-element of the fourth light receiving element, and thereby obtaining the differential value of changes in light amount of the light beam.

8. An optical disk drive according to claim 5, further comprising disk tilt compensating means for compensating the tilt in the radial direction and the tilt in the tangential direction of the desired track, the disk tilt compensating means including:

first and second optical elements having substantially the same optical characteristics and being provided so as to be rotatable around the optical axis of the light beam;

first and second rotation means for rotating the first and second optical elements, respectively; and means for generating a same direction rotation signal representing a rotation amount of the first and second optical elements in the same direction, and an opposite direction rotation signal representing a rotation amount thereof in an opposite direction, wherein the disk tilt compensating means rotates the first and second optical elements in the same direction in accordance with the same direction rotation signal and rotates the first and second optical elements in the opposite direction in accordance with the opposite direction rotation signal, and thereby compensating the tilt in the radial direction and the tilt in the tangential direction.

9. An optical disk drive according to claim 1, wherein the signal processing means detects a tilt amount in a tangential direction of the desired track of the optical disk on the basis of a differential value of changes in light amount of the light beam received by the light receiving means.

10. An optical disk drive according to claim 9, wherein the signal processing means detects the tilt amount in the tangential direction by calculating a difference between the peak and bottom values of the differential value of changes in light amount of the light beam.

11. An optical disk drive according to claim 10, further comprising disk tilt compensating means for compensating the tilt in the radial direction and the tilt in the tangential direction of the desired track, the disk tilt compensating means including:

first and second optical elements having substantially the same optical characteristics and being provided so as to be rotatable around the optical axis of the light beam;

first and second rotation means for rotating the first and second optical elements, respectively; and means for generating a same direction rotation signal representing a rotation amount of the first and second optical elements in the same direction, and an opposite direction rotation signal representing a rotation amount thereof in an opposite direction, wherein the disk tilt compensating means rotates the first and second optical elements in the same direction in accordance with the same direction rotation signal and rotates the first and second optical elements in the opposite direction in accordance with the opposite direction rotation signal, and thereby compensating the tilt in the radial direction and the tilt in the tangential direction.

* * * * *

UNITED STATES PATENT AND TRADEMARK OFFICE
CERTIFICATE OF CORRECTION

PATENT NO. : 5,523,989
DATED : June 4, 1996
INVENTOR(S) : Hiromichi Ishibashi

It is certified that error appears in the above-indentified patent and that said Letters Patent is hereby corrected as shown below:

Col. 1, line 3, and item [54] on the title page;
In the title, delete "DIFRRACTION" and substitute --DIFFRACTION--.

In the specification, column 9, line 59, delete "$\phi$" and substitute --$\psi$--; line 61, delete "$\phi$" and substitute --$\psi$--; line 64, delete the second occurrence of "$\phi$" and substitute --$\psi$--. Column 10, line 18, delete "$\phi$" and substitute --$\psi$--; equation (9) should read:

$$Ws(r,\theta) = w(r,\theta - \phi - \psi) + W(r,\theta - \phi - \psi)$$
$$= wr^3\{\cos(\theta - \phi - \psi) + \cos(\theta - \phi - \psi)\}$$
$$= 2wr^3\cos\psi\cos(\theta - \phi)$$
$$= k(\psi)\cos(\theta - \phi)$$

Column 10, equation (10) should read --$k(\psi) = 2wr^3\cos\psi$--; line 33, delete "$\phi$" and substitute --$\psi$--; line 34, delete "$k(\phi)$" and substitute --$k(\psi)$--; line 36, delete "$\phi$" and substitute --$\psi$--; line 45, delete "$\phi$" and substitute --$\psi$--; line 54, delete "$\phi$" and substitute --$\psi$--. Column 11, line 3, delete "$\phi$" and substitute --$\psi$--; line 7, delete "-$\phi$" and substitute -- -$\psi$ --.

Signed and Sealed this

First Day of July, 1997

*Attest:*

*Attesting Officer*

BRUCE LEHMAN
*Commissioner of Patents and Trademarks*